Feb. 6, 1923.

O. HUTCHINS ET AL.
SAFE OR VAULT PLATE.
ORIGINAL FILED NOV. 3, 1921.

1,444,610.

INVENTORS
Otis Hutchins & C. E. Hawk
by Byrnes, Stebbins, Burgess & Lorinche
attys Patented Feb. 6, 1923.

1,444,610

UNITED STATES PATENT OFFICE.

OTIS HUTCHINS AND CLARENCE E. HAWKE, OF NIAGARA FALLS, NEW YORK, ASSIGNORS TO THE CARBORUNDUM COMPANY, OF NIAGARA FALLS, NEW YORK, A CORPORATION OF PENNSYLVANIA.

SAFE OR VAULT PLATE.

Application filed November 3, 1921, Serial No. 512,483. Renewed December 11, 1922.

*To all whom it may concern:*

Be it known that we, OTIS HUTCHINS and CLARENCE E. HAWKE, both citizens of the United States, residing at Niagara Falls, Niagara County, New York, have invented a new and useful Improvement in Safe or Vault Plates, of which the following is a full, clear, and exact description, reference being had to the accompanying drawings, in which—

Figure 1:
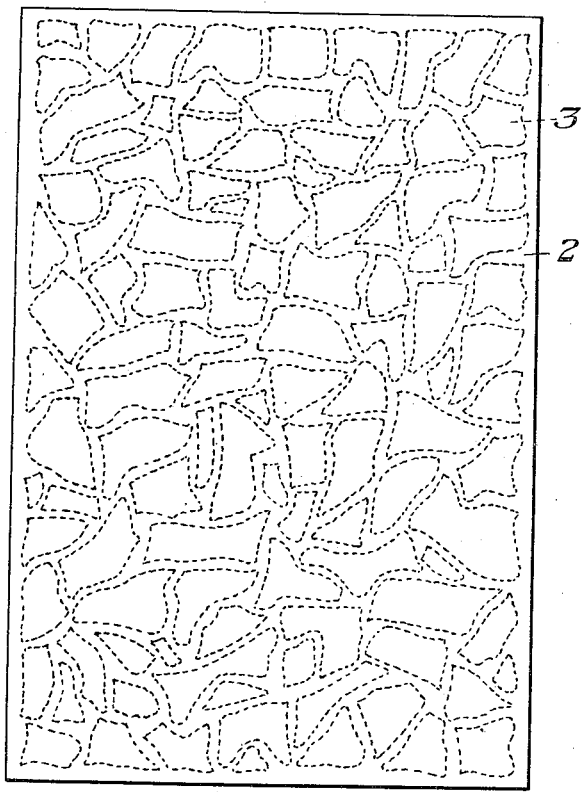
Figure 2:
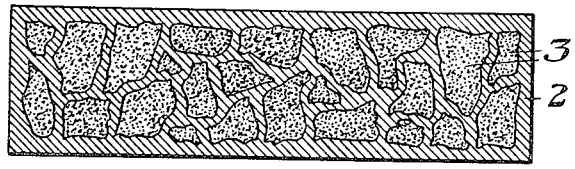

Figure 1 is a plan view of a safe or vault plate made in accordance with our invention; and Figure 2 is a cross section of the same.

The object of our invention is to provide plates for vaults or safe walls, which are more or less impregnable to the action of high temperature agents and flames, such as the oxy-acetylene flame.

To improve the heat-resisting qualities of an iron or steel plate and make it more resistant toward burning by high temperature flames, such as the oxy-acetylene, it has been proposed to imbed in the plate pieces ranging in size from two to eight inches in diameter of the regular grade of fused aluminous abrasive commonly used in the manufacture of grinding wheels and other articles in the abrasive industry. This, however, has always resulted in failure for the following reason. This aluminous material has approximately the following chemical composition.

| | |
|---|---|
| $Al_2O_3$ | 94.40 |
| $SiO_2$ | .90 |
| $TiO_2$ | 3.00 |
| $FeO$ | .50 |
| $CaO$ | .70 |
| $MgO$ | .50 |
| | 100.00 |

The alumina ($Al_2O_3$) content is largely present in the form of crystallized alumina, the other materials being combined into a glass which cements together the alumina crystals into a solid dense mass. When an iron or steel plate containing pieces of the above mentioned aluminous product is subjected to the action of the oxy-acetylene flame, the iron is rapidly melted and if an excess of oxygen is used, the molten iron is converted into the oxide. Iron oxide which has only a slow fluxing action upon crystallized alumina combines rapidly with the glass or matrix holding together the alumina crystals thus liberating the crystals and breaking down the refractory body.

Our invention is intended to overcome the difficulties mentioned above, thus producing a refractory plate which offers great resistance toward burning. Our invention contemplates the use of very high purity refractory aluminous materials containing at least 97.0% alumina and less than 1% titanium oxide. Typical analyses of materials suitable for this use are given below, one sample being prepared by reducing the impurities from bauxite by means of carbon in an electric furnace, and the other prepared by fusing purified alumina in an electric furnace.

| | Made from bauxite and carbon. | Made from purified alumina. |
|---|---|---|
| $SiO_2$ | .34 | Trace |
| $FeO$ | .14 | .12 |
| $TiO_2$ | .86 | Trace |
| $CaO$ | .12 | .30 |
| $MgO$ | .32 | .26 |
| $Al_2O_3$ | 98.22 | 99.32 |

We have found that an iron plate containing pieces of this high purity aluminous material offers much greater resistance toward burning by the acetylene flame than a plate containing the usual type of aluminous refractory material. As a concrete example, it has been found possible to burn through a six inch thick iron plate containing an aluminous refractory analyzing 94% $Al_2O_3$ in one-fifth of the time required to burn through a similar plate containing an aluminous refractory material analyzing 98% $Al_2O_3$.

In making a slab or plate for use in the construction of a burglar-proof vault, we prepared a dry sand mold of the required shape and character, such as is usual in the making of iron or steel castings. In the center of the mold we placed a bed of refractory material usually supported by expanded metal. In a plate six inches thick, we would use pieces of the refractory material two to four inches in diameter. The molten iron or steel is cast around the bed of refractory material so that the material is entirely surrounded by iron. We may employ cast iron, steel or alloy steels to give increased strength and toughness.

In the drawings, 2 represents the cast metal of the plate and 3 the fragments of refractory aluminous material embedded therein.

Our invention is not limited to the particular materials, the analysis of which is given above, as there are always variations in the chemical composition of the class of materials.

By the word "metal" in our claims, we intend to cover either substantially pure metals or alloys.

We claim:

1. A safe or vault plate composed of cast metal in which are imbedded fragments of a refractory aluminous material containing at least 97% alumina.

2. A refractory metallic plate consisting of cast metal in which are imbedded fragments of a refractory aluminous material containing at least 97.0% $Al_2O_3$ and less than 1% $TiO_2$.

3. A refractory metallic plate consisting of cast iron in which are imbedded fragments of a refractory aluminous material containing at least 97.0% $Al_2O_3$ and less than 1% $TiO_2$.

In testimony whereof we have hereunto set our hands.

OTIS HUTCHINS.
CLARENCE E. HAWKE.